United States Patent Office 3,338,937
Patented Aug. 29, 1967

3,338,937
METHOD FOR PRODUCING A CRYSTALLINE NICKEL SALT OF 1-NITROSO-2-NAPHTHOL
Charles G. Inman, Fort Edward, N.Y., assignor to Hercules Incorporated, a corporation of Delaware
No Drawing. Filed July 6, 1965, Ser. No. 469,867
6 Claims. (Cl. 260—439)

This application is a continuation-in-part of copending application Ser. No. 347,015, filed Feb. 24, 1964, now abandoned, entitled Method for Producing A Nickel Salt of 1-Nitroso-2-Naphthol.

This invention relates to a process for producing a crystalline, light stable nickel chelate of 1-nitroso-2-naphthol.

Nickel chelates of 1-nitroso-2-naphthol are known in the art. For example, Ilinski and Knorre, Ber. Deut. Chem. 18, 701 (1885) describe the brownish yellow precipitate of nickel 1-nitroso-2-naphthol formed by reacting either an aqeuous or 50% acetic acid solution of 1-nitroso-2-naphthol with a nickel salt solution. Additionally, MacQueen in U.S. Patent 1,993,971 discloses that iron complexes of 1-nitroso-2-naphthol can be prepared by the action of iron salts upon 1-nitroso-2-naphthol or its bisulfite compound. Cobalt, nickel, and chromium are also said to form complex, strongly colored compounds with the nitroso naphthol, the complexes having different shades but otherwise similar properties. The nickel 1-nitroso-2-naphthol compounds produced by these prior art methods, however, have very poor light stability and therefore cannot be used successfully as pigments in many applications.

A novel crystalline form of the nickel chelate of 1-nitroso-2-naphthol which differs from that of the prior art has been produced which has an X-ray diffraction pattern characterized by strongest interplanar spacings, referred to as $d$-spacings, at about 11.6, 9.6, 6.0, 4.9, 4.5, and 3.6 Angstroms, possesses outstanding light stability, and is a highly effective pigment.

The present invention is directed to the novel process for making this crystalline, light stable nickel chelate of 1-nitroso-2-naphthol wherein there is formed in an aqueous reaction medium a nickel salt of 1-nitroso-2-naphthol which is recovered from the aqueous medium, and then heated at a temperature above about 120° C. but below its decomposition point until the product is converted to the crystalline, light stable form of the nickel chelate.

The nickel salt of 1-nitroso-2-naphthol which is subsequently heat treated in accordance with the process of the invention can be prepared in an aqueous reaction medium in various ways. For example, in one preferred procedure, an aqueous ammonical solution of 1-nitroso-2-naphthol is reacted with a nickel compound at a temperature below about 40° C. In this procedure, sufficient ammonia is present to maintain at least some, if not a large part, of the nitroso phenol in solution and to maintain the medium basic. However, the amount of ammonia present as ammonium hydroxide is not critical, and large excesses may be used without being harmful to the reaction. For most practical purposes, from about 0.5 to about 10 moles, and preferably about 3 to about 5 moles, of ammonium hydroxide per mole of 1-nitroso-2-naphthol will be sufficient. The reaction takes place readily at below about 40° C. within short periods of time, but preferably is conducted at below 35° C., and more preferably at about 0° C. to about room temperature for times varying up to about several hours. Temperatures above about 40° C. are not suitable, however, for the process of this invention, since the product which is formed gives, upon subsequent heating, an inferior pigment which is less permanent to light and less clean in hue. The 1-nitroso-2-naphthol used for reacting with the nickel salt can be prepared by any of the methods given in the literature for nitrosating $\beta$-naphthol, as, for example, according to the preparations given in Beilstein's Handbuch der Organischen Chemie, 4th ed. 7, 712 (1925), 1st supplement, 385 (1931), 2nd supplement, 647 (1948), Verlag von Julius Springer, Berlin, or by Marvel and Porter, Organic Syntheses, 2, 61 (1922) or by the procedure of U.S. Patent No. 3,051,750 to Dettwyler (1962).

In a second procedure, the nickel salt of 1-nitroso-2-naphthol which is subsequently heat treated is formed by nitrosating an aqueous slurry of $\beta$-naphthol with an aqueous solution of sodium nitrite at below room temperature and preferably at 0-10° C. in the presence of mineral acids and the nickel compound, the acid being fed slowly to an alkaline solution of the $\beta$-naphthol to adjust the pH to below about 4.5 and, after nitrosation is completed, increasing the pH of the aqueous reaction medium to about 4.7 to 8.5 to complete chelation. Alternatively, in this procedure the nickel compound can be added to the aqueous medium after nitrosation is completed rather than prior to nitrosation. This second procedure has the advantage of enabling nitrosation and chelation to be carried out in a single process step. Although the nickel compound can be added to the reaction medium at any time, i.e., before, during or after nitrosation, the nickel compound is preferably introduced after sufficient acid has been added to reduce the pH below about 9. After the nitrosation is complete, the pH of the reaction medium is adjusted to between about 4.7 and about 8.5 and preferably to about 6 by addition of alkali, and if desired, in the presence of a buffer such as sodium phosphate, to complete chelation. The chelation takes place readily at room temperature or below but is ideally conducted at from room temperature up to the boiling point of the medium.

The amount of nickel compound used in the formation of the chelate by either procedure should be sufficient to complex all of the nitroso naphthol, and preferably will not exceed the ratio of 1.1 atoms of nickel per 2 molecules of 1-nitroso-2-naphthol since large excesses of nickel should be avoided.

Any nickel compound which is reactive with 1-nitroso-2-naphthol in aqueous medium can be used in the process of the invention, and the nickel compound can be added to the reaction medium as a solid or as an organic or aqueous solution. Preferred nickel compounds include such nickel salts as the sulfate, nitrate, bromide, chloride, acetate, formate, and 2-ethylhexanoate of nickel or the like.

The reaction product, prior to heating, can also be treated with an inert liquid organic diluent which is a partial solvent for the nickel chelate and which, during treatment, tends to reduce the particle size of the product and hence improve its transparency. The treatment with an organic diluent prior to heating is a preferred embodiment of this invention.

The reaction product can be recovered from the aqueous medium in any manner known for separating a solid from a liquid, such as decantation, filtration, centrifugation, and the like, and then dried, preferably at below 100° C. and more preferably within the range of 70–85° C.

In accordance with this invention, the reaction product is heated at a temperature above about 120° C. but below the decomposition point of the product until the product is converted to the crystalline, light stable form of the nickel chelate. The heating can be carried out in any convenient manner and at any desired pressure, i.e., at atmospheric, superatmospheric or subatmospheric. The time required to convert the product to its crystalline form will vary, of course, depending upon the manner and conditions of heating with longer times being required at the lower temperatures. Preferably, the heating is carried out at about 125° C. to about 225° C. for a period of time up to about 48 hours, and more preferably at about 150° C. to about 180° C.

As mentioned above, the preferred embodiment of the invention requires the use of an inert organic liquid diluent which is a partial solvent for the nickel chelate.

The treatment with the liquid diluent can be carried out in any manner known for wetting a solid with a liquid and at any temperature at which the diluent is a liquid. The amount of diluent employed should be sufficient to wet the product but may be present in excess of that amount. Advantageously, the diluent will be used within the range from about 1.3 to about 5 times the weight of the product. Amounts below about 1.3 times are usually insufficient to wet the product satisfactorily, and amounts in excess of about 5 times the weight of the product do not increase the ease of wetting and additionally increase costs due to loss of expensive diluent during heating or due to the necessity of including expensive recovery steps. The length of treatment is not critical and will vary from that length of time necessary to wet the product at its interfaces up to about 24 hours or longer. Usually, from about 10 minutes up to about 4 hours will be sufficient to wet the product completely. Suitable diluents for this embodiment include alkanols, aromatic hydrocarbons, and the like, and preferably ethanol, xylene, toluene, benzene, and the like.

The nickel chelate of this invention is believed to contain two molecules of 1-nitroso-2-naphthol per atom of nickel and has the probable structure illustrated by the following formulae:

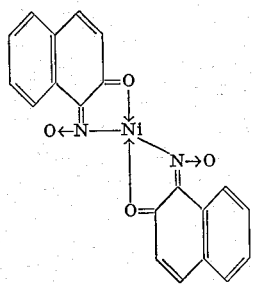

or

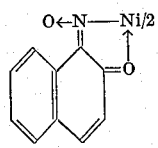

This chelate is characterized by an X-ray diffraction pattern which exhibits strongest $d$-spacings at about 11.6, 9.6, 6.0, 4.9, 4.5, and 3.6 Angstroms, is a brown solid decomposing above 300° C., and is insoluble or only slightly soluble in water and most of the common organic solvents. In addition to exhibiting excellent lightfastness, the chelate possesses high transparency, good tinctorial strength, good stability to dilute acids and alkalies, good heat stability, and excellent bleed resistance in nonpolar solvents. It is of value as a pigment in numerous applications but has particular value as a pigment in enamels applied to metallic substrates or when used in conjunction with finely divided metallic particles, or as a pigment for plastics where it exhibits excellent lightfastness.

The invention will be illustrated by reference to the following examples in which all percentages and parts are by weight unless otherwise specified.

EXAMPLE 1

Seventeen and eight-tenths (17.8) parts (0.1 mole) of 1-nitroso-2-naphthol (prepared by adding sulfuric acid to an alkaline solution of 0.42 mole of $\beta$-naphthol and 0.41 mole of sodium nitrite at 0° C.) was stirred into 1500 parts of water containing 50.3 parts of 29% ammonium hydroxide and 1.2 parts of the sodium salt of condensed naphthalene sulfonic acid as dispersing agent for 30 minutes at 20° C., and a solution of 13.6 parts (0.05 mole) of nickel sulfate hexahydrate in 100 parts of water was added over one hour. The slurry was heated to boiling and filtered, and the residue was washed free of sulfate ions with water and then dried at 82° C. The resulting product (designated as product A) exhibited the following X-ray diffraction pattern:

PRODUCT A

| Line | $2\phi$ | $dA^1$ | $I^2$ | Percent I/I max.[3] |
|---|---|---|---|---|
| 1 | 5.5 | 16.0 | 2,450 | 100 |
| 2 | 16.7 | 5.32 | 1,575 | 64 |
| 3 | 18.7 | 4.76 | 1,050 | 43 |
| 4 | 21.3 | 4.17 | 85 | 3 |
| 5 | 23.6 | 3.77 | 1,100 | 45 |
| 6 | 24.8 | 3.59 | 270 | 11 |
| 7 | 30.1 | 2.97 | 400 | 16 |
| 8 | 33.9 | 2.64 | 190 | 8 |
| 9 | 37.9 | 2.38 | 280 | 11 |
| 10 | 48.3 | 1.884 | 195 | 8 |

[1] dA = interplanar spacing expressed in Angstrom units.
[2] I = intensity in counts per second over backgound.
[3] I/I max. = relative intensity.

A portion of product A obtained above was next heated in an open container for 24 hours at 175° C. The heat-treated product (designated as product B) exhibited the following X-ray diffraction pattern which was unlike that of product A and showed strongest $d$-spacings at about 11.6, 9.6, 6.0, 4.9, 4.5, and 3.6 Angstroms.

PRODUCT B

| Line | $2\phi$ | $dA^1$ | $I^2$ | Percent I/I max.[3] |
|---|---|---|---|---|
| 1 | 7.6 | 11.7 | 2,800 | 100 |
| 2 | 9.1 | 9.7 | 1,075 | 38 |
| 3 | 9.5 | 9.3 | ---- | s |
| 4 | 12.8 | 6.9 | 150 | 5 |
| 5 | 13.6 | 6.5 | 125 | 4 |
| 6 | 14.7 | 6.0 | 830 | 30 |
| 7 | 18.2 | 4.89 | 475 | 17 |
| 8 | 19.5 | 4.56 | 500 | 18 |
| 9 | 21.2 | 4.21 | 300 | 11 |
| 10 | 24.4 | 3.65 | 650 | 23 |
| 11 | 25.6 | 3.48 | 250 | 9 |
| 12 | 29.0 | 3.08 | 118 | 4 |
| 13 | 30.6 | 2.92 | 155 | 5 |
| 14 | 32.5 | 2.75 | 275 | 10 |
| 15 | 36.5 | 2.46 | ---- | s |
| 16 | 37.2 | 2.42 | 160 | 6 |

[1] dA = interplanar spacing expressed in Angstrom units.
[2] I = intensity in counts per second over backgound.
[3] I/I max. = relative intensity.
s = unresolved shoulder on a more intense reflection.

By comparison, a nickel chelate prepared from the bisulfite derivative of 1-nitroso-2-naphthol according to the procedure of Example 1 of the MacQueen Patent U.S. 1,993,971, except that an equivalent amount of nickel sulfate hexahydrate was substituted for the copperas crystals and the zinc oxide was omitted, exhibited the following X-ray diffraction pattern:

| Line | 2φ | dA[1] | I[2] | Percent I/I max.[3] |
|---|---|---|---|---|
| 1 | 6.5 | 13.7 | 620 | 40 |
| 2 | 7.8 | 11.3 | 1,540 | 100 |
| 3 | 9.3 | 9.5 | 112 | 7 |
| 4 | 10.2 | 8.7 | 338 | 22 |
| 5 | 11.2 | 7.9 | 225 | 15 |
| 6 | 13.6 | 6.5 | | |
| 7 | 14.0 | 6.3 | 1,050 | s 68 |
| 8 | 15.5 | 5.71 | 205 | 13 |
| 9 | 17.1 | 5.18 | 300 | 19 |
| 10 | 18.7 | 4.74 | 200 | 13 |
| 11 | 19.4 | 4.58 | 800 | 52 |
| 12 | 20.3 | 4.37 | 65 | 4 |
| 13 | 21.8 | 4.08 | 320 | 21 |
| 14 | 23.4 | 3.80 | 320 | 21 |
| 15 | 24.6 | 3.64 | 105 | 7 |
| 16 | 26.8 | 3.32 | 290 | 19 |
| 17 | 27.4 | 3.25 | 195 | 13 |
| 18 | 29.1 | 3.07 | 245 | 16 |
| 19 | 41.4 | 2.18 | 55 | 4 |

[1] dA=interplanar spacing expressed in Angstrom units.
[2] I=intensity in counts per second over backgorund.
[3] I/I max.=relative intensity.
s=unresolved shoulder on a more intense reflection.

Lightfastness of the pigments designated as products A and B and the pigment prepared according to the aforesaid MacQueen procedure and referred to as the Mac-Queen pigment were compared on paper drawouts in a Fadeometer. The inks used for these drawouts were prepared by mulling the pigments in litho varnish and then reducing the resulting dispersions with either aluminum hydrate paste or zinc white paste, the same pigment-to-vehicle ratio and same reduction being employed for each. The pigment of product B showed slight fading after 200 hours of exposure of the zinc white drawout and 400 hours of exposure of the aluminum hydrate drawout whereas the pigment of product A and the MacQueen pigment showed considerable fading after 8 hours of exposure using either the zinc white or aluminum hydrate drawout.

The solubility characteristics of the pigment designated as product B were also evaluated as follows:

*Paraffin wax.*—No visual discoloration of the wax was observed when 1 part pigment was heated to 85° C. with 20 parts paraffin wax and then filtered.

*n-Hexane.*—Neither visual nor photometric discoloration of n-hexane was observed when 1 part pigment was stirred with 10 parts n-hexane for 2 hours at 57° C. and then filtered.

*Acid and alkali.*—No visual differences in hue or intensity were observed when paper drawouts which had been partially immersed in 5% soda ash solution or 1.5% hydrochloric solution for 15 minutes were dried and compared with the nonimmersed portion of the drawout. The paper drawouts for these tests were prepared by mulling 5 parts pigment with 8 parts litho varnish, applying the resulting ink to paper sheets with a drawout knife, and then drying the paper sheets at room temperature.

EXAMPLE 2

A portion of product A of Example 1 was ground through a 1/32" screen, was agitated at room temperature with 2.5 times its weight of xylene for 5 minutes, was allowed to stand for 2.5 hours in a closed container, and then was heated in an open container for 24 hours at 175° C.

The X-ray diffraction pattern of the resulting pigment indicated that its major component was substantially identical with product B of Example 1, the pigment exhibiting under examination with the electron microscope a product composed essentially of acicular crystals having a maximum length of about 0.2 micron. When the pigment was tested according to the procedure of Example 1, the paper drawouts indicated fade resistance comparable to those from the pigment of product B of Example 1.

The product of this example was also evaluated as a pigment by dispersing the product with or without non-leafing aluminum paste in enamel vehicles, spraying the enamel on test panels, or applying the enamel to aluminum foil with a coating rod and then heating the coated panels or foil for 30 minutes at 121° C. All of the enamels which contained aluminum paste or which were applied over aluminum gave attractive transparent coatings having a golden-brown to gold appearance which did not show more than a slight degree of fading after 200 hours of exposure in the Weather-O-Meter. The compositions of the enamels, the amount of pigment, and the substrate employed in these tests are tabulated below:

| Test No. | Enamel Composition | Percent Pigment | Percent Al Paste by wt. of Pigment | Substrate |
|---|---|---|---|---|
| 1 | 85% short oil soya alkyd resin, 15% melamine formaldehyde resin. | 2 | 0 | Aluminum foil. |
| 2 | 85% short oil soya alkyd resin, 15% melamine formaldehyde resin. | 15 | 35 | Automotive steel panel. |
| 3 | 75% short oil soya alkyd resin, 25% melamine formaldehyde resin. | 2 | 0 | Aluminum panel. |
| 4 | 75% short oil soya alkyd resin, 25% melamine formaldehyde resin. | 2 | 0 | Coated cardboard stock. |

By comparison, coatings prepared in the same manner as above except that transparent iron oxide was substituted for the nickel pigment were dull and dirty in appearance.

When the baked enamel coating of test number 4 was overstriped with white lacquer or overstriped with white alkyd-melamine formaldehyde enamel and baked, no bleeding of the pigment into the overstriping was observed.

EXAMPLE 3

The procedure of Example 2 was repeated with the exception that product A was agitated at room temperature for 5 minutes with 1.4 times rather than 2.5 times its weight of xylene and allowed to stand for 2.5 hours in a closed container prior to heating. The product was substantially identical with that of Example 2.

EXAMPLES 4–7

In these examples, portions of product A of Example 1 were ground, treated with xylene, and then heated according to the procedure of Example 2 except that the time, temperature, and manner of heating were varied as noted below in Table 1. The products of each of these examples exhibited X-ray diffraction patterns and a degree of lightfastness substantially identical with the pigment designated as product B.

TABLE 1

| Example No. | Heat Treatment Temp., ° C. | Time in Hrs. |
|---|---|---|
| 4 | 120 | 48 |
| 5 | 270 | 1 |
| 6 [1] | 175 | 24 |
| 7 [2] | 175 | 24 |

[1] Prior to the heat treatment, the xylene paste was placed in a sealed bomb and heated at 175° C. for 4 hrs., cooled, and then removed from the bomb. The calculated pressure during this treatment was 25 atms.
[2] Heat treatment was carried out under vacuum.

EXAMPLE 8

A solution of 61.2 parts (0.42 mole) of β-naphthol dissolved in 17.0 parts of sodium hydroxide in 200 parts of water at 80° C. was mixed with 1700 parts of ice and water to bring the resulting slurry to 0° C. or below and then mixed with 28.8 parts (0.41 mole) of sodium nitrite dissolved in 100 parts of water. A solution of 98.0 parts of 93.5% sulfuric acid in 800 parts of water at 0° C. was next introduced over about 15 minutes until the pH of the slurry reached 7.0, at which point the addition of the sulfuric acid solution was stopped. Fifty-eight and seven-tenths (58.7) parts (0.22 mole) of nickel sulfate hexahydrate was dissolved in the remaining sulfuric acid solution and the resulting solution was added to the slurry over about 45 minutes while maintaining the temperature of the slurry at 0° C. by the addition of ice. The slurry was stirred for an additional 30 minutes after which the pH of the slurry was adjusted to 6.0 with 10.0 parts of anhydrous sodium acetate in 100 parts of water and a solution of 60.0 parts of sodium hydroxide dissolved in 800 parts of water, added over about 30 minutes. Next 1.4 parts of the sodium salt of condensed naphthalene sulfonic acid was added and the slurry stirred for another 30 minutes at 0° C. The slurry was then heated to boiling at the rate of one degree per minute, boiled for one hour and filtered. The residue was washed free of sulfate ions with water, dried at 71° C., ground through a 1/32" screen, mixed with 4 times its weight of xylene and then allowed to stand for 1.5 hours in a closed container. The pigment slurry was next heated for 16 hours at 175° C. in an open container, cooled, and ground through a 1/32" screen. The product of this example was substantially identical with that of Example 2.

What I claim and desire to protect by Letters Patent is:

1. A process of making a crystalline, light stable nickel chelate of 1-nitroso-2-naphthol, characterized by having an X-ray diffraction pattern which exhibits strongest $d$-spacings at about 11.6, 9.6, 6.0, 4.9, 4.5 and 3.6 Angstroms, which comprises forming in an aqueous reaction medium a nickel salt of 1-nitroso-2-naphthol, recovering the solid product from the aqueous medium and then heating the recovered product at a temperature above about 120° C. but below the decomposition point of the product until the product is converted to the crystalline, light stable form of the nickel chelate.

2. The process of claim 1 wherein the recovered product, prior to the heating step, is treated with an inert organic liquid diluent which is a partial solvent for the nickel chelate.

3. The process of claim 1 wherein the nickel salt of 1-nitroso-2-naphthol is formed by reacting an aqueous ammonical solution of 1-nitroso-2-naphthol with a nickel compound at a temperature below about 40° C.

4. The process of claim 1 wherein the nickel salt of 1-nitroso-2-naphthol is formed by nitrosating an aqueous slurry of β-naphthol in the presence of a nickel compound at a pH below about 4.5, and then adjusting the pH of the slurry to between about 4.7 and about 8.5 to complete the chelation.

5. The process of claim 1 wherein the nickel salt of 1-nitroso-2-naphthol is formed by nitrosating an aqueous slurry of β-naphthol at a pH below about 4.5, adding a nickel compound to the slurry after the nitrosation is completed and then adjusting the pH of the slurry to between about 4.7 and about 8.5 to complete the chelation process.

6. A process of making a crystalline, light stable nickel chelate of 1-nitroso-2-naphthol, characterized by having an X-ray diffraction pattern which exhibits strongest $d$-spacings at about 11.6, 9.6, 6.0, 4.9, 4.5, and 3.6 Angstroms, which comprises reacting 1-nitroso-2-naphthol with a nickel compound in an aqueous reaction medium, recovering the solid reaction product from the aqueous medium, and then heating the recovered reaction product at a temperature above about 120° C. but below the decomposition point of the product until the product is converted to the crystalline, light stable form of the nickel chelate.

References Cited
UNITED STATES PATENTS

| | | | |
|---|---|---|---|
| 2,178,809 | 11/1939 | Rosenblatt | 260—429 |
| 2,259,641 | 10/1941 | Horning | 260—439 |
| 2,726,920 | 12/1955 | Federkiel et al. | 260—439 |

TOBIAS E. LEVOW, *Primary Examiner.*

A. P. DEMERS, *Assistant Examiner.*